(12) United States Patent
Blauvelt

(10) Patent No.: US 12,732,534 B2
(45) Date of Patent: Sep. 8, 2026

(54) SYSTEMS AND METHODS FOR DETECTION OF DENIAL OF SERVICE ATTACKS FOR PROTOCOLS WITH HIGH BURST DATA RATES

(71) Applicant: Fortinet, Inc., Sunnyvale, CA (US)

(72) Inventor: Christopher Graham Blauvelt, Lowville, NY (US)

(73) Assignee: FORTINET, INC., Sunnyvale, CA (US)

( * ) Notice: Subject to any disclaimer, the term of this patent is extended or adjusted under 35 U.S.C. 154(b) by 299 days.

(21) Appl. No.: 18/208,387

(22) Filed: Jun. 12, 2023

(65) Prior Publication Data

US 2024/0414197 A1 Dec. 12, 2024

(51) Int. Cl.
*G06F 15/16* (2006.01)
*H04L 9/40* (2022.01)

(52) U.S. Cl.
CPC ...... *H04L 63/1458* (2013.01); *H04L 63/0227* (2013.01)

(58) Field of Classification Search
CPC ........................ H04L 63/1458; H04L 63/0227
See application file for complete search history.

(56) References Cited

U.S. PATENT DOCUMENTS

2014/0304798 A1* 10/2014 Iyengar ............... H04L 63/1458 726/11
2023/0283631 A1* 9/2023 Bjarnason ........... H04L 63/1416

FOREIGN PATENT DOCUMENTS

WO WO-0221296 A1 * 3/2002 ............. H04L 43/00
WO WO-2024174432 A1 * 8/2024 ......... H04L 63/1425

OTHER PUBLICATIONS

Jun Li; Constantine Manikopoulos; The Application of a Low Pass Filter in Anomaly Network Intrusion Detection; Proceedings from the Fifth Annual IEEE SMC Information Assurance Workshop, 2004; Jun. 2004; Conference Paper; Publisher: IEEE; pp. 265-271 (Year: 2004).*
IEEE Standard for Inverse-Time Characteristics Equations for Overcurrent Relays, IEEE Power and Energy Society, Feb. 5, 2019, 25 pages.
Kumar et al., “Digital design and implementation of an overcurrent relay on FPGA”, IEEE 2017, 5 pages.

* cited by examiner

*Primary Examiner* — Shewaye Gelagay
*Assistant Examiner* — Courtney D Fields
(74) *Attorney, Agent, or Firm* — Jaffery Watson Hamilton & DeSanctis LLP

(57) ABSTRACT

Various embodiments provide systems and methods for detecting denial of service attacks using a varying threshold.

19 Claims, 6 Drawing Sheets

SYSTEMS AND METHODS FOR DETECTION OF DENIAL OF SERVICE ATTACKS FOR PROTOCOLS WITH HIGH BURST DATA RATES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2022, Fortinet, Inc.

FIELD

Embodiments discussed generally relate to systems and methods for detecting denial of service attacks, and more particularly for detecting denial of service attacks using a varying threshold.

BACKGROUND

Denial of service attacks involve flooding a server with a large number of requests such that it cannot keep up, and therefore fails. A common method for detecting such denial of service attacks involves identifying a data or packet rate that exceeds a threshold, and based upon this assuming that a denial of service attack is underway. Such a method works well for environments and protocols that have a substantially consistent level of traffic. However, such an approach may improperly flag high burst data rates of legitimate traffic. To avoid this, the threshold for declaring a denial of service attack can be raised, however, this often still fails to accommodate bursts of legitimate traffic and delays declaring a denial of service attack when the burst is not legitimate.

Hence, there exists a need in the art for advanced systems and methods for detecting denial of service attacks.

SUMMARY

Various embodiments provide systems and methods for detecting denial of service attacks, and more particularly for detecting denial of service attacks using a varying threshold.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
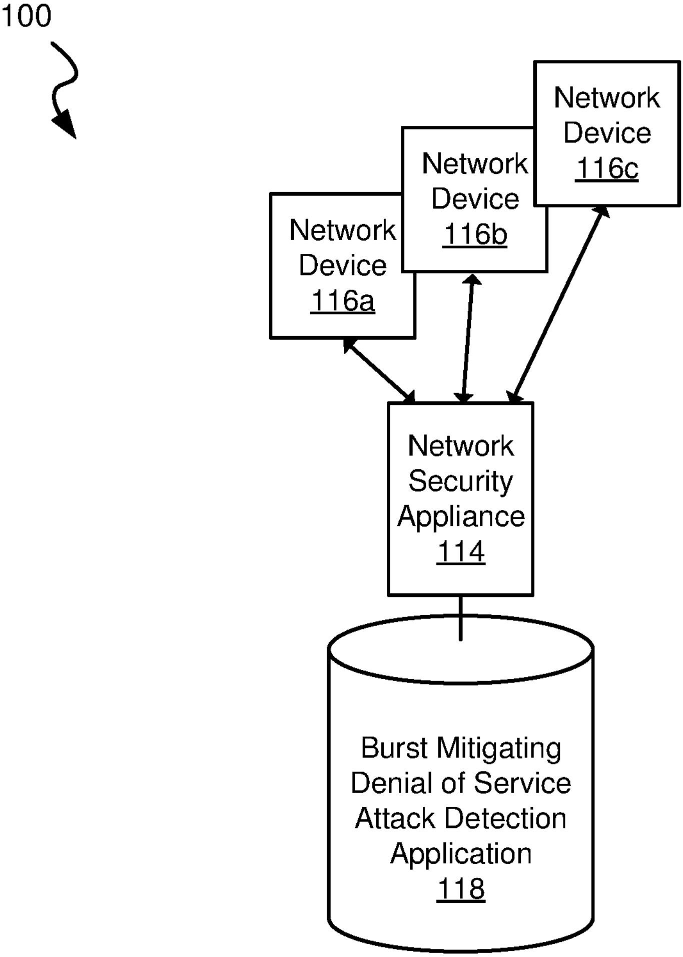
FIG. 1A-1C illustrates a network architecture including a network security appliance providing burst mitigating denial of service attack detection in accordance with some embodiments.

Various embodiments provide systems and methods for detecting denial of service attacks, and more particularly for detecting denial of service attacks using a varying threshold.

Some embodiments disclosed herein use inverse time curves to cause the declaration of a Denial of Service (DOS) attack to occur more slowly at or near an attack threshold, and more quickly when a traffic threshold is operating significantly above the attack threshold. Such an approach avoids declaration of a DOS attack when legitimate traffic is being received from protocols such as, for example, BACNET is a protocol that is commonly used in Building Automation Control Systems (BACS) which rely on sending multi-cast messages to all devices whenever an update to a measured value occurs, and which can cause significant, but short bursts of network traffic. This burst of network activity can be amplified as one or more of the recipient devices are triggered to perform activities that also generated network activity.

In some embodiments, declaration of a DOS attack is controlled by the following equations:

$$t(\text{Rate}) = \left( \frac{A}{\left(\frac{\text{Rate}}{\text{Rate Threshold}}\right)^p - 1} + B \right)$$

$$t_r(\text{Rate}) = \frac{t_r}{\left(\frac{\text{Rate}}{\text{Rate Threshold}}\right)^2 - 1}$$

$$Z_i = Z_s - Z_r$$

$$Z_S = \begin{cases} \frac{\Delta T}{t(\text{Rate})} & \text{for Rate} > \text{Rate Threshold} \\ 0 & \text{for } 0 \le \text{Rate} \le \text{Rate Threshold} \end{cases}$$

$$Z_r = \begin{cases} \frac{\Delta T}{t_r(\text{Rate})} & \text{for } 0 \le \text{Rate} \le \text{Rate Threshold} \\ 0 & \text{for Rate} > \text{Rate Threshold} \end{cases}$$

where t(Rate) is the time (t) operating above a rate threshold for the particular measured rate of network traffic (Rate), p, A, and B are terms that control the degree to which the time curve is inverse, $t_r$(Rate) is the time (t) operating below a rate threshold, $t_r$ is the reset time at Rate equal to zero (0), and ΔT is the interval at which traffic is sampled.

As an example, a network device may be designed to work for a BACS which uses a combination of BACNET and MODBUS applications where it is desired to detect a bad actor on the network that will try to flood the network with BACNET traffic, overwhelming the other devices on the network. The network device may be configured to implement an inverse time curve. The network device may include a rate threshold set at one-hundred ten percent (110%) of the expected steady-state message rate. In such a network device a BACNET event may occur that causes a large amount of traffic equal to three-hundred thirty percent (330%) of the expected steady-state message rate. In such a situation, a DOS attack would not be declared where the large amount of traffic does not continue for more than the time calculated above.

In contrast, for the same network device that experiences a large amount of traffic equal to one-thousand percent (1000%) of the expected steady-state message rate. In such a significant uptick in messaging, the time (t (Rate)) would be much less and result in a declaration of a DoS attack in only a short time of the messaging rate being sustained.

Embodiments of the present disclosure include various processes, which will be described below. The processes are described as being performed by a general processor executing machine-executable instructions, but in some cases some or all of the processes may be implemented in hardware. Such hardware may be, but is not limited to, an application specific integrated circuit (ASIC) that is configured to perform the described processes.

Embodiments may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Other embodiments may be provided as an ASIC. Yet other embodiments may be provided as a hybrid between an ASIC which performs part of the processes, a general purpose processor, and a computer program product, which may include a machine-readable storage medium tangibly embodying thereon instructions, which may be used to program the general purpose processor (or other electronic devices) to perform one or more of the processes.

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", a "network element", or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a "network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances). Some network security appliances may operate as network switches.

As used herein, the phrases "network path", "communication path", or "network communication path" generally refer to a path whereby information may be sent from one end and received on the other. In some embodiments, such paths are referred to commonly as tunnels which are configured and provisioned as is known in the art. Such paths may traverse, but are not limited to traversing, wired or wireless communication links, wide area network (WAN) communication links, local area network (LAN) communication links, and/or combinations of the aforementioned. Based upon the disclosure provided herein, one of ordinary skill in the art will recognize a variety of communication paths and/or combinations of communication paths that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

The term "circuit" is used in its broadest sense to mean any circuit including a number of transistors that operate together to perform a particular function or process. Based upon the disclosure provided herein, one of ordinary skill in the art will recognize a variety of circuits and/or circuit types that may be used in relation to different embodiments.

Example embodiments will now be described more fully hereinafter with reference to the accompanying drawings. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Various embodiments provide methods for detecting a denial of service attack. The methods include: monitoring, by a processing resource, network traffic; determining, by the processing resource, a rate at which the network traffic is occurring to yield a network traffic rate; determining, by the processing resource, whether a derivative of the network traffic rate exceeds a threshold rate; modifying, by the processing resource, an accumulation time based at least in part on the determination whether the derivative of the network traffic rate exceeds a threshold rate; determining, by the processing resource, whether the accumulation time exceeds an accumulation threshold; and declaring, by the processing resource, a denial of service attack when the accumulation time exceeds the accumulation threshold. In some cases, one or both of the threshold rate and/or the accumulation rate is/are user programmable.

In some instances of the aforementioned embodiments, modifying the accumulation time based at least in part on the determination whether the derivative of the network traffic rate exceeds a threshold rate includes: incrementing, by the processing resource, the accumulation time when the derivative of the network traffic rate is greater than the threshold rate; and decrementing, by the processing resource, the accumulation time when the derivative of the network traffic rate is less than the threshold rate. In some such instances, incrementing the accumulation time is done by adding a fixed value to a prior instance of the accumulation time; and decrementing the accumulation time is done by subtracting the fixed value from the prior instance of the accumulation time.

In various instances of the aforementioned embodiments where the network traffic rate is an instant network traffic rate and the derivative of the network traffic rate is a filtered network traffic rate, the methods further include low pass filtering, by the processing resource, the instant network traffic rate to yield the filtered network traffic rate. In some such instances, the low pass filtering is done by averaging the instant network traffic rate with prior instances of network traffic rates occurring in a defined time window to yield the filtered network traffic rate. In some cases, the defined time window is user programmable.

Other embodiments provide systems for detecting a denial of service attack that include: a processing resource and a non-transient computer readable medium coupled to the processing resource. The non-transient computer readable medium has stored therein instructions that when executed by the processing resource cause the processing resource to: monitor network traffic; determine a rate at which the network traffic is occurring to yield a network traffic rate;

determine whether a derivative of the network traffic rate exceeds a threshold rate; modify an accumulation time based at least in part on the determination whether the derivative of the network traffic rate exceeds a threshold rate; determine whether the accumulation time exceeds an accumulation threshold; and declare a denial of service attack when the accumulation time exceeds the accumulation threshold.

Yet other embodiments provide non-transient computer readable media having stored therein instructions that when executed by a processing resource cause the processing resource to: monitor network traffic; determine a rate at which the network traffic is occurring to yield an instant network traffic rate; low pass filter the instant network traffic rate to yield a filtered network traffic rate; determine whether a the filtered network traffic rate exceeds a threshold rate; modify an accumulation time based at least in part on the determination whether the derivative of the network traffic rate exceeds a threshold rate; determine whether the accumulation time exceeds an accumulation threshold; and declare a denial of service attack when the accumulation time exceeds the accumulation threshold.

Turning to FIG. 1A, network architecture 100 is shown that includes including a network security appliance 114 providing burst mitigating denial of service attack detection in accordance with some embodiments. In some embodiments, the burst mitigating denial of service attack detection is provided by a processing resource of network security appliance 114 executing a burst mitigating denial of service attack detection application 118. As discussed in more detail below, network security appliance 114 providing burst mitigating denial of service attack detection monitors network traffic between network devices 116 (i.e., between two of a network device 116*a*, a network device 116*b*, and a network device 116*c*) to determine whether at least some of the network traffic is an attempt to cause a DoS. The monitored network traffic is used to calculate traffic rates in a way that allows for declaring a DOS attack based upon thresholds, but at the same time accommodating high burst applications operating in relation to network security appliance 114. In some embodiments, the network security appliances is a network switch or network firewall.

As just one of many example, BACNET is a protocol that is commonly used within BACS. Many peer-peer device applications operate by sending multi-cast messages to all devices whenever an update to a measured value occurs. Other devices then use this data in their control loops which may cause action and more data transmission. Such a multi-cast approach can lead to bursts of network traffic, often referred to as a broadcast storm, which could trigger a declaration of a DoS assertion for any reasonable threshold set above the expected steady state transmission rate. Network security appliance 114 executing a burst mitigating denial of service attack detection application 118 avoids such a spurious declaration of a DOS attack by slowing a declaration of a DOS attack for network traffic rates at or near a rate threshold, and operating more quickly for network traffic rates significantly above the threshold. This allows for setting a rate threshold near an observed steady state network traffic rate for network security appliance 114 without necessarily declaring a DOS attack any time the rate threshold is exceeded.

Network devices 116*a*, 116*b*, 116*c* may respectively be any device that is capable of communicating via a communication network. As just some examples, network devices 116*a*, 116*b*, 116*c* may be a Programmable Logic Controller (PLC), Distributed Control System (DCS), Intelligent Electronic Device (IED), server, personal computer, or the like. Based upon the disclosure provided herein, one of ordinary skill in the art will recognize a number of network devices that may be used in relation to different embodiments.

As an example, network device 116*a* may transmit a communication to network device 116*c*. In such an example, network traffic from network device 116*a* is transferred via network security appliance 114, and from network security appliance 114 to network security device 116*c*.

In some cases a multicast transfer may be performed. As an example, network device 116*a* may transmit the same communication to all of network device 116*b* and network device 116*c*. In such an example, network traffic from network device 116*a* is transferred via network security appliance 114. In turn, network security appliance 114 transfers the network traffic to the respective network devices 116. Such a multi-cast can generate considerable network traffic passing network security appliance 114, and in old style DoS detection systems may be flagged as a DOS attack.

Figure 1B:
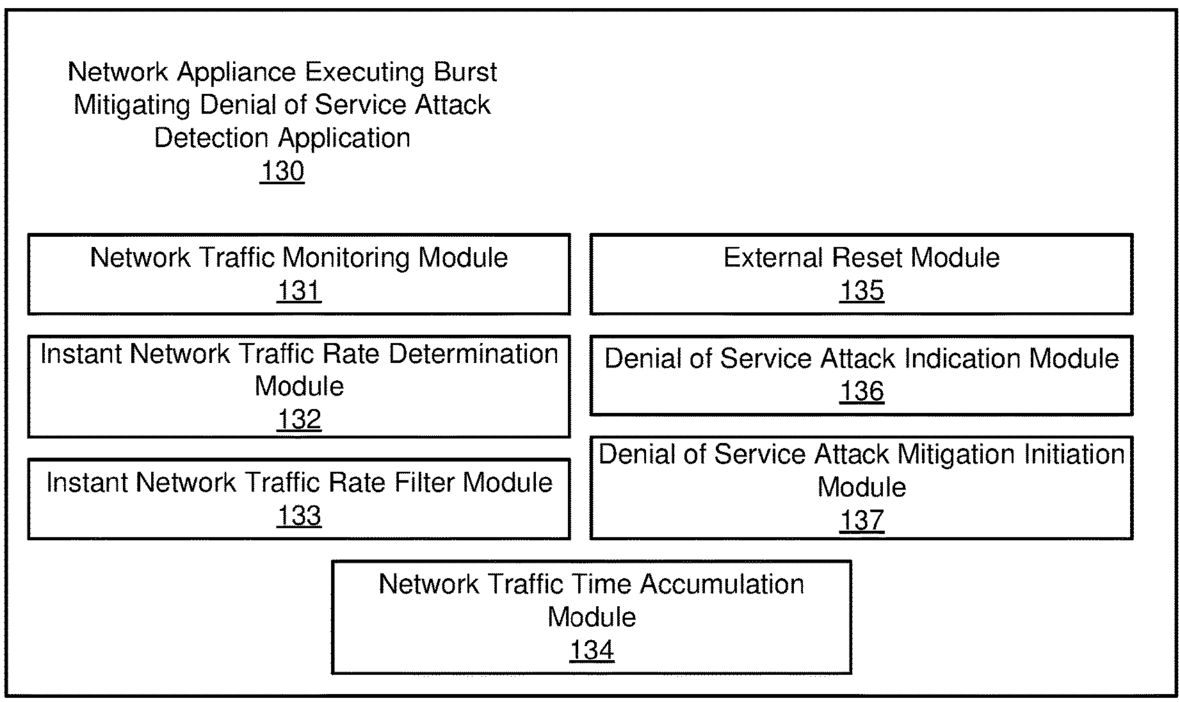

Turning to FIG. 1B, an example implementation of a network security appliance executing burst mitigating denial of service attack detection application 130 (e.g., network security appliance 114 executing burst mitigating denial of service attack detection application 118) is shown in accordance with some embodiments. As shown in this example, network appliance executing burst mitigating denial of service attack detection application 130 includes: a network traffic monitoring module 131, an instant network traffic rate determination module 132, an instant network traffic rate filter module, a network traffic rate accumulation module 134, an external reset module 135, a denial of service attack indication module 136, and a denial of service attack mitigation module 137.

Network traffic monitoring module 131 is configured to monitor network traffic passing through the network security appliance. Such monitoring may include monitoring a number of indicia including, but not limited, a volume of network traffic being processed. Based upon the disclosure provided herein, one of ordinary skill in the art will recognize a variety of approaches for identifying a volume of network traffic being received that may be used in relation to different embodiments.

Instant network traffic rate determination module 132 is configured to calculate a rate at which network traffic is currently passing through the network security appliance. This current network traffic rate is periodically updated and is discussed herein as an instant network traffic rate. This instant network traffic rate may be determined using any approach known in the art and may be, but is not limited to, expression as bytes/second, packets/second, or message/second.

Instant network traffic rate filter module is configured to low pass filter the instant network traffic rate to yield a filtered network traffic rate. In some embodiments, the low pass filtering is performed by averaging a number of determined instant network traffic rates over a moving window. Thus for example, the moving window may be the preceding twenty (20) seconds. In such an example, all of the instant network traffic rates determined within the prior twenty (20) sample intervals of the most recent instant network traffic rates are averaged together to yield the filtered traffic rate. Based upon the disclosure provided herein, one of ordinary skill in the art will recognize a variety of low pass filtering approaches that may be applied to the determined instant network traffic rates to smooth spikes.

In some embodiments, the aforementioned incrementing is done in accordance with the following equation: $Z_n=Z_{n-}$ $_1+Z_i$, where $Z_{n-1}$ is the prior accumulation time value, and $Z_i$ is as defined above. As such, the accumulation time corresponds to a period over which the filtered traffic rate exceeds the rate threshold. Similarly, the aforementioned decrementing is done in accordance with the following equation: $Z_n=Z_{n-1}-Z_i$, where $Z_{n-1}$ is the prior accumulation time value, and $Z_i$ is as defined above. As such, the accumulation time is reduced to reflect a period over which the filtered traffic rate did not exceed the rate threshold until the accumulation value reaches zero.

In some embodiments, the aforementioned incrementing is done in accordance with the following equation: $Z_n=Z_{n-1}+Z_i$, where $Z_{n-1}$ is the prior accumulation time value, and $Z_i$ is the amount of time between the most recent instant network traffic rate and the immediately prior instant network traffic rate. In some cases, the amount of time between the most recent instant network traffic rate and the immediately prior instant network traffic rate is assumed to be substantially constant and $Z_i$ is set equal to one (1). As such, the accumulation time corresponds to a period over which the filtered traffic rate exceeds the rate threshold. Similarly, the aforementioned decrementing is done in accordance with the following equation: $Z_n=Z_{n-1}-Z_i$. Again, in some embodiments, the amount of time between the most recent instant network traffic rate and the immediately prior instant network traffic rate is assumed to be substantially constant and $Z_i$ is set equal to one (1). As such, the accumulation time is reduced to reflect a period over which the filtered traffic rate did not exceed the rate threshold.

Further, network traffic time accumulation module 134 is configured to reset the accumulated time to a reset value any time it receives a reset signal from external reset module 135 and the Rate is below the Rate Threshold. Network traffic time accumulation module 134 does not decrement the accumulated time below zero. Thus, the accumulated time reflects a net amount of time that the filtered network traffic rate exceeds the rate threshold.

External reset module 135 is configured to receive user input or input from an external process to reset the accumulation time. When such an input is received, external reset module 135 provides a reset request to network traffic time accumulation module 134.

Denial of service attack indication module 136 is configured to compare the time accumulation with a user programmable accumulation threshold to determine if the accumulation time is greater than the accumulation threshold. Where the accumulation time exceeds the accumulation threshold, denial of service attack indication module 136 declares a DOS attack. Such a declaration may include sending a message to one or more designated recipients and/or to denial of service attack mitigation module 137 indicating what is believed to be a DOS attack.

Denial of service attack mitigation module 137 is configured to initiate a playbook of processes defined for mitigating a DOS attack. The playbook of processes may include any processes known in the art for mitigating a DOS attack.

Figure 1C:
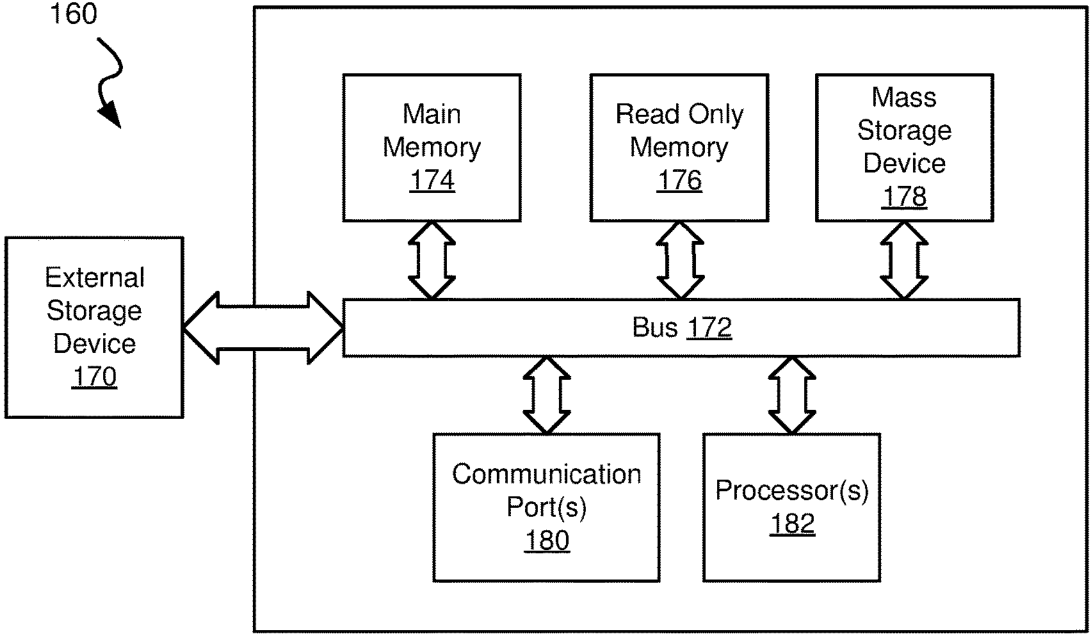

Turning to FIG. 1C, an example computer system 160 is shown in which or with which part or all of network transfer system 104 may be deployed. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network traffic transfer system 104.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25 G, 40 G, and 100 G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
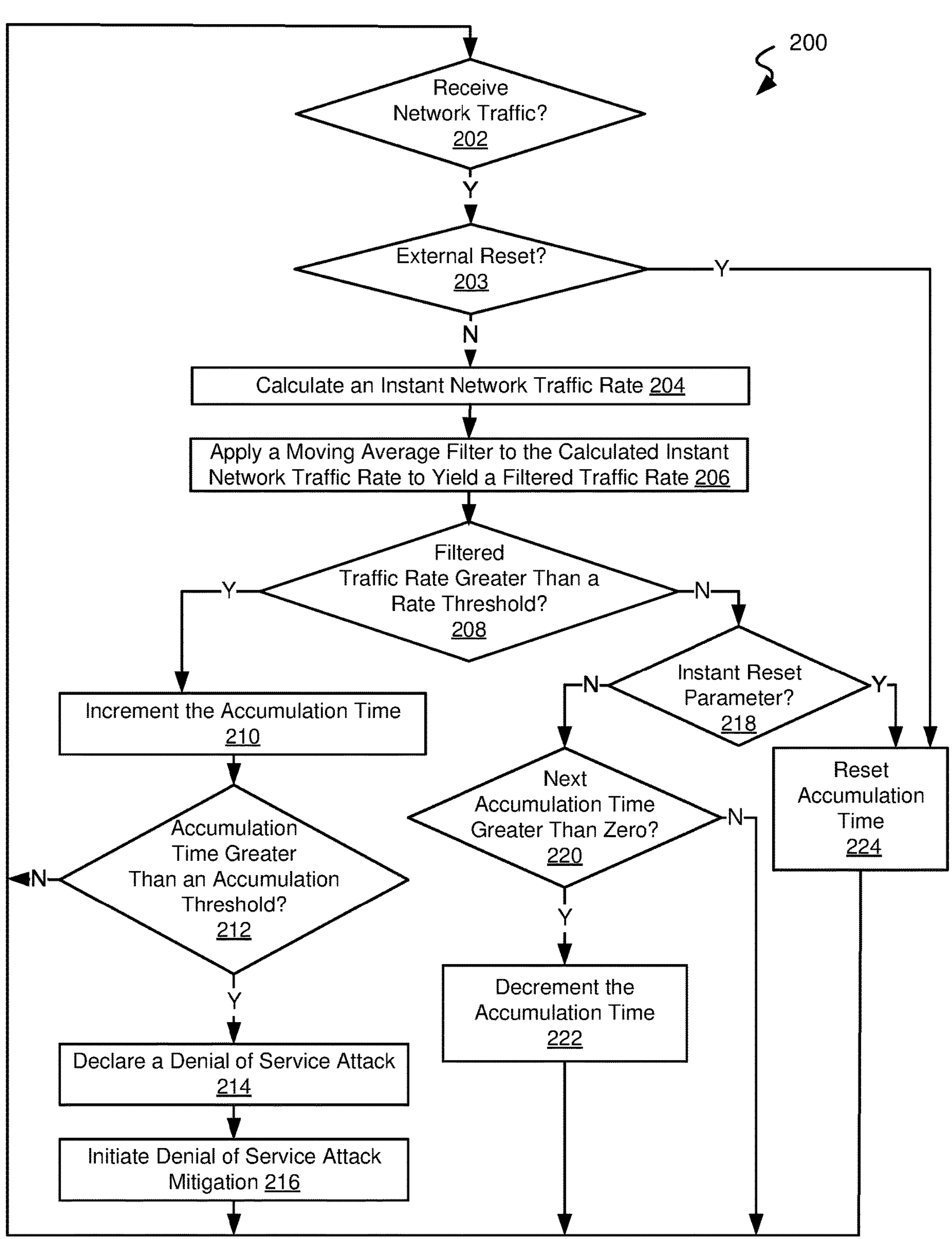
FIG. 2 is a flow diagram showing a method in accordance with some embodiments for performing burst mitigating denial of service attack detection in accordance with various embodiments.

Turning to FIG. 2, a flow diagram 200 shows a method in accordance with some embodiments for performing burst mitigating denial of service attack detection in accordance with various embodiments. Following flow diagram 200, network traffic is monitored (block 202). As an example, where the method is being implemented by a network security appliance, the monitoring of network traffic includes monitoring of all network traffic that passes through the network security appliance. The monitored network traffic is that directed between nodes communicating over a communication network. It is determined whether an external reset has been received (block 203). An external reset may be, but is not limited to, a reset signal received from a user or another process. Where an external reset has been received (block 203), an accumulation time is reset to zero '0' (block 224).

Alternatively, where an external reset has not been received (block 203), an instant network traffic rate is determined (block 204). This instant network traffic rate may be determined using any approach known in the art and may be, but is not limited to, expression as bytes/second, packets/second, or message/second.

The determined instant network traffic rate is low pass filtered to reduce the impact of significant spikes to yield a filtered traffic rate (block 206). In some embodiments, the low pass filtering is performed by averaging a number of determined instant network traffic rates over a moving window. Thus for example, the moving window may be the preceding twenty (20) sample intervals. In such an example, all of the instant network traffic rates determined within the prior twenty (20) sample intervals of the most recent instant network traffic rates are averaged together to yield the filtered traffic rate. Based upon the disclosure provided herein, one of ordinary skill in the art will recognize a variety of low pass filtering approaches that may be applied to the determined instant network traffic rates to smooth spikes.

The filtered traffic rate is compared with a user programmable rate threshold to determine if the filtered traffic rate is greater than the rate threshold (block 208). Where the filtered traffic rate is greater than the rate threshold (block 208), an accumulation time is incremented (block 210). In some embodiments, this incrementing may be done in accordance with the following equation: $Z_n=Z_{n-1}+Z_i$, where $Z_{n-1}$ is the prior accumulation time value, and $Z_i$ is as defined above. As such, the accumulation time corresponds to a period over which the filtered traffic rate exceeds the rate threshold.

The updated accumulation time is compared with a user programmable accumulation threshold to determine if the accumulation time is greater than the accumulation threshold (block 212). Where the accumulation time exceeds the accumulation threshold (block 212), a DoS attack is declared (block 214) and DOS attack mitigation is initiated (block 216). Declaring a DOS attack may include, but is not limited to, sending a message to a user defined recipient indicating the occurrence of a presumed DOS attack. Initiating DOS attack mitigation may include, but is not limited to, initiating a playbook of processes defined for mitigating a DoS attack. The playbook of processes may include any processes known in the art for mitigating a DOS attack.

Alternatively, where the filtered traffic rate is not greater than the rate threshold (block 208), it is determined whether an instant reset parameter has been triggered (block 218). Where the instant reset parameter has been triggered (block 218), the accumulation time is reset to zero '0' (block 224). Otherwise, where no instant reset parameter has been triggered (block 218), it is determined whether the accumulation time will be greater than zero (0) after the decrementing (block 220). This is done to avoid decrementing the accumulation time to a value less than zero and may be done in accordance with the following equation: $Z_{n-1}+Z_i$, >0 where $Z_{n-1}$ is the prior accumulation time value, and $Z_i$ is as defined above.

Where the accumulation time will remain greater than zero (block 220), the accumulation time is decremented (block 222). In some embodiments, this decrementing may be done in accordance with the following equation: $Z_n=Z_{n-1}-Z_i$, where $Z_{n-1}$ is the prior accumulation time value, and $Z_i$ is as defined above. As such, the accumulation time is reduced to reflect a period over which the filtered traffic rate did not exceed the rate threshold.

Figure 3:
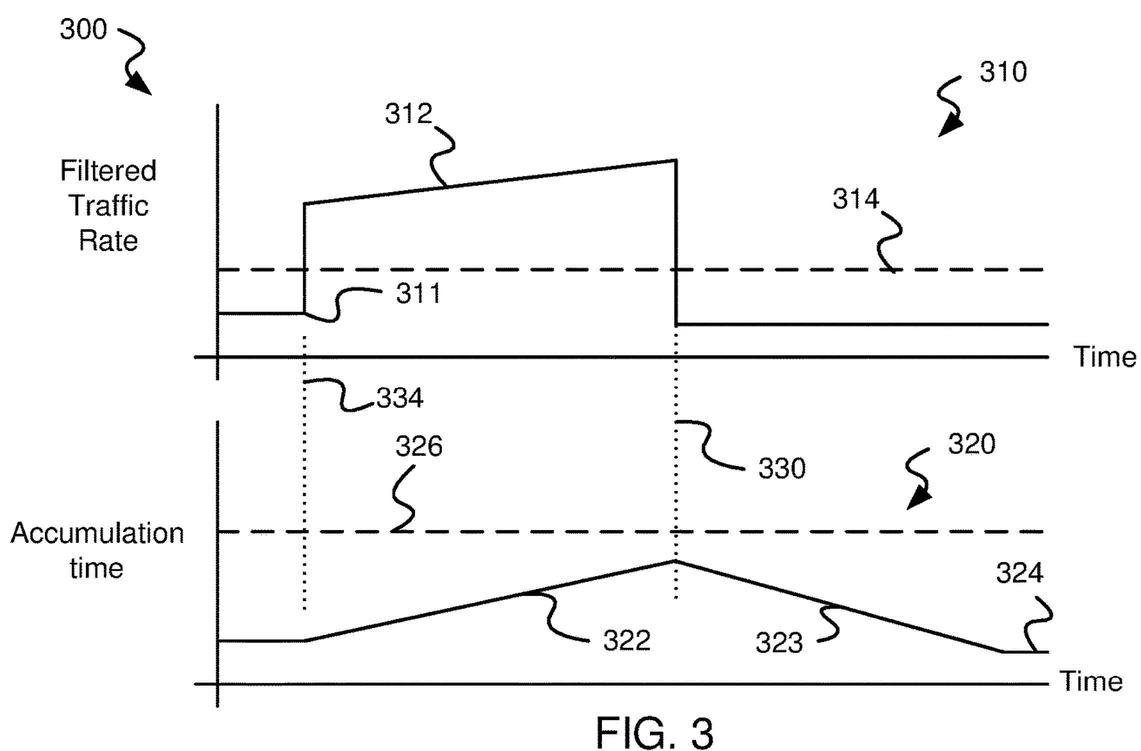
FIGS. 3-6 show different example operations of a network security appliance providing burst mitigating denial of service attack detection in accordance with different embodiments.

Turning to FIGS. 3-6, different example operations of a network security appliance providing burst mitigating denial of service attack detection in accordance with different embodiments. Turning to FIG. 3, a scenario 300 is shown where the filtered traffic rate 310 (i.e., the instant traffic rate after low pass filtering) bursts from a steady low rate 311 past a rate threshold 314 to a steadily increasing rate 312. As discussed above in relation to FIG. 2, once filtered traffic rate 310 exceeds threshold rate 314 at time 334 (shown with a dotted line), and accumulation time 320 starts to increase (shown as segment 322) with the increase corresponding to the time during which filtered traffic rate 310 exceeds threshold rate 314.

When filtered traffic rate 310 transitions back below threshold rate 314 at a time 330, accumulation time 320 starts to decrease (shown as segment 323) in such a way that corresponds to the time during which filtered traffic rate 310 does not exceed threshold rate 314. Ultimately, accumulation time 320 reaches a lower threshold (shown as segment 324) where it is no longer decremented. As shown, accumulation time 320 never exceeds an accumulation threshold 326, and as such a DOS attack is never declared.

Figure 4:
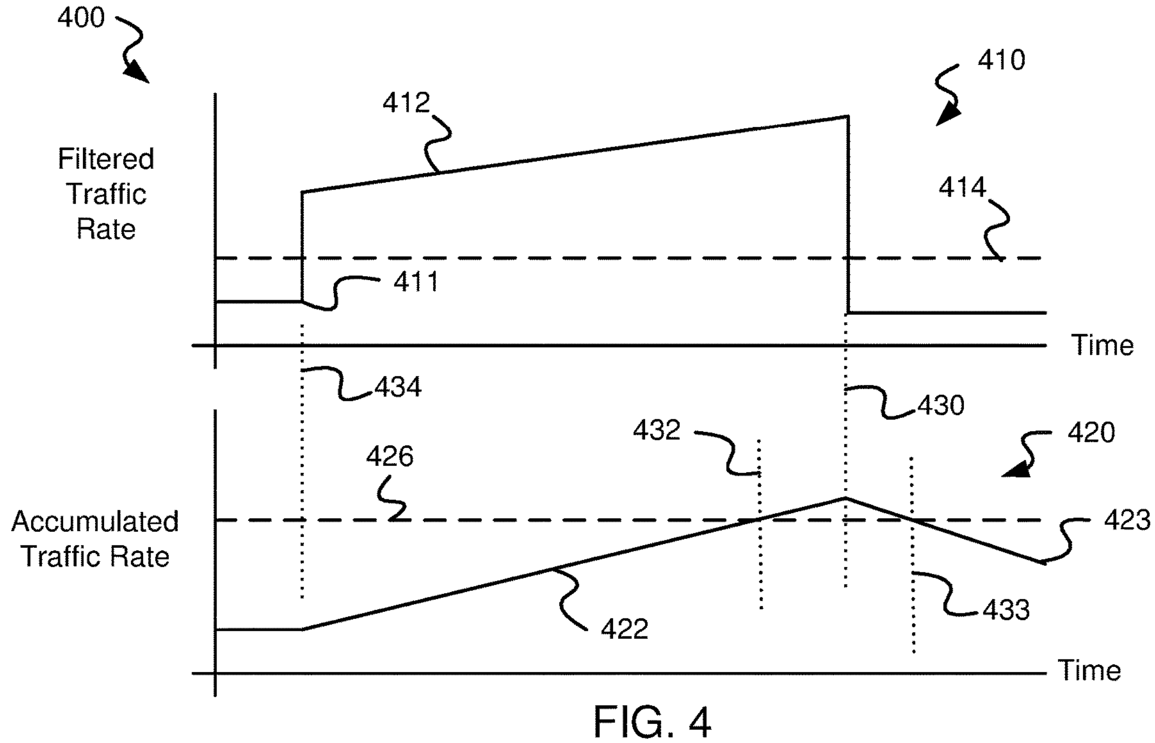

Turning to FIG. 4, a scenario 400 is shown where the filtered traffic rate 410 (i.e., the instant traffic rate after low pass filtering) bursts from a steady low rate 411 past a rate threshold 414 to a steadily increasing rate 412. As discussed above in relation to FIG. 2, once filtered traffic rate 410 exceeds threshold rate 414 at time 434 (shown with a dotted line), and accumulation time 420 starts to increase (shown as segment 422) with the increase corresponding to the time during which filtered traffic rate 410 exceeds threshold rate 414.

When filtered traffic rate 410 transitions back below threshold rate 414 at a time 430, accumulation time 420 starts to decrease (shown as segment 423) in such a way that corresponds to the time during which filtered traffic rate 410 does not exceed threshold rate 414. As shown, accumulation time 420 exceeds an accumulation threshold 426 at time 432 and remains above accumulation threshold 426 until a time 433. A DOS attack is declared beginning at time 432 and continuing until time 433.

Figure 5:
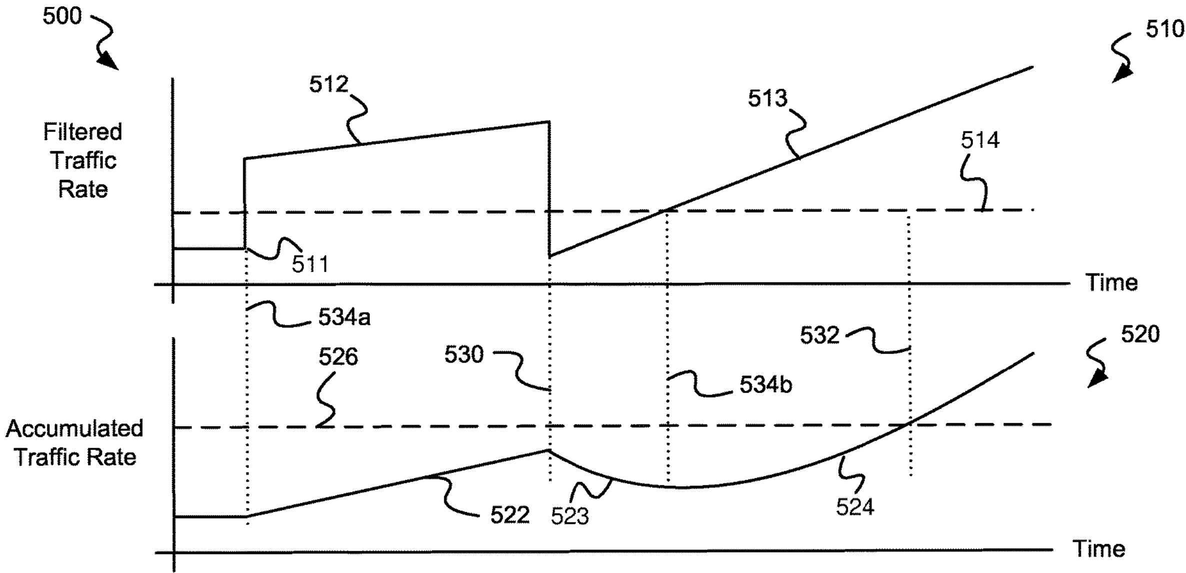

Turning to FIG. 5, a scenario 500 is shown where the filtered traffic rate 510 (i.e., the instant traffic rate after low pass filtering) bursts from a steady low rate 511 past a rate threshold 514 to a steadily increasing rate 512. As discussed above in relation to FIG. 2, once filtered traffic rate 510 exceeds threshold rate 514 at time 534*a* (shown with a dotted line), and accumulation time 520 starts to increase (shown as segment 522) with the increase corresponding to the time during which filtered traffic rate 510 exceeds threshold rate 514.

When filtered traffic rate 510 transitions back below threshold rate 514 at a time 530, accumulation time 520 starts to decrease (shown as segment 523) in such a way that corresponds to the time during which filtered traffic rate 510 does not exceed threshold rate 514. As shown, accumulation time 520 never exceeds an accumulation threshold 526 before time 530, and as such a DOS attack is not declared.

Filtered traffic rate 510 begins a steady increase beginning at time 530 (shown as segment 513) until it exceeds threshold rate 514 at time 534*b* (shown with a dotted line). At this point, accumulation time 520 again starts to increase (shown as segment 524) with the increase corresponding to the time during which filtered traffic rate 510 exceeds threshold rate 514. Ultimately, accumulation time 520 exceeds accumulation threshold 526 at a time 532, and as such a DOS attack is declared at time 532.

Figure 6:
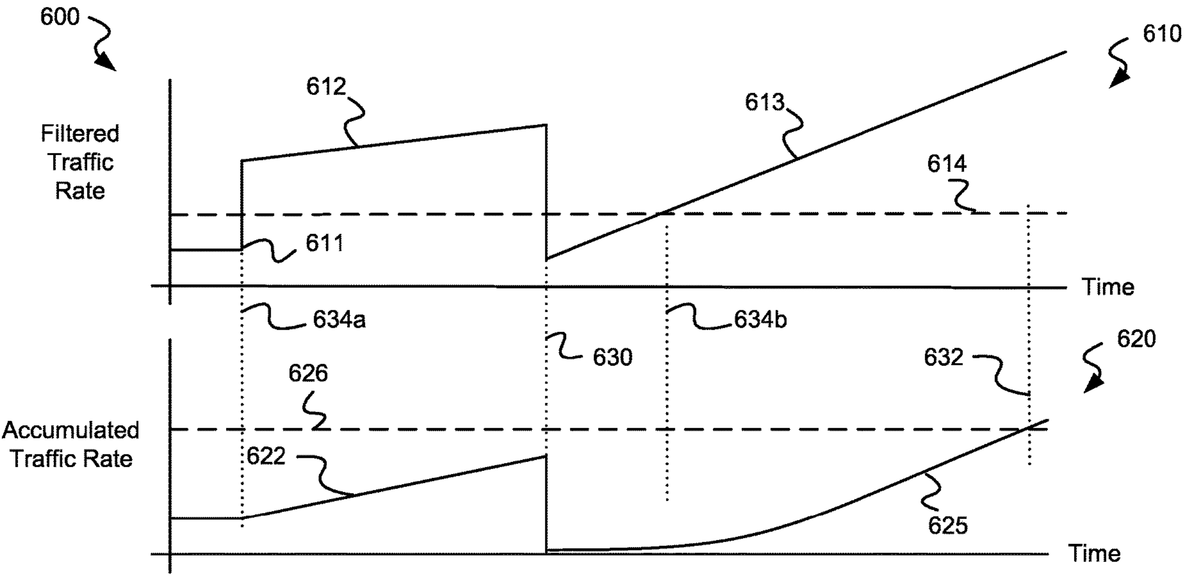

Turning to FIG. 6, a scenario 600 is shown where the filtered traffic rate 610 (i.e., the instant traffic rate after low pass filtering) bursts from a steady low rate 611 past a rate threshold 614 to a steadily increasing rate 612. As discussed above in relation to FIG. 2, once filtered traffic rate 610 exceeds threshold rate 614 at time 634*a* (shown with a dotted line), and accumulation time 620 starts to increase (shown as segment 622) with the increase corresponding to the time during which filtered traffic rate 610 exceeds threshold rate 614.

An external reset is received at a time 630 (shown as a dotted line) causing an accumulation time 620 to reset. In some embodiments, an instant reset parameter is used in place of or in addition to the aforementioned external reset and causes a modified reset condition. This modified reset condition is an instantaneous reset of accumulation time 620 if filtered traffic rate 610 falls below threshold rate 614. Filtered traffic rate 610 begins a steady increase beginning at time 630 (shown as segment 613) until it exceeds threshold rate 614 at time 634*b* (shown with a dotted line). At this point, accumulation time 620 again starts to increase (shown as segment 625) with the increase corresponding to the time during which filtered traffic rate 610 exceeds threshold rate 614. Ultimately, accumulation time 620 exceeds accumulation threshold 626 at a time 632, and as such a DOS attack is declared at time 632.

In conclusion, the present disclosure provides for novel systems, devices, and methods. While detailed descriptions of one or more embodiments have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for detecting a denial of service attack, the method comprising:

monitoring, by a processing resource, network traffic;

determining, by the processing resource, a rate at which the network traffic is occurring to yield a network traffic rate, wherein the network traffic rate is an instant network traffic rate;

determining, by the processing resource, whether a derivative of the network traffic rate exceeds a threshold rate, wherein the derivative of the network traffic rate is a filtered network traffic rate, wherein the determining includes low pass filtering the instant network traffic rate to yield the filtered network traffic rate by averaging the instant network traffic rate with prior instances of network traffic rates occurring in a defined time window to yield the filtered network traffic rate;

modifying, by the processing resource, an accumulation time based at least in part on the determination whether the derivative of the network traffic rate exceeds a threshold rate;

determining, by the processing resource, whether the accumulation time exceeds an accumulation threshold; and declaring, by the processing resource, a denial of service attack when the accumulation time exceeds the accumulation threshold.

2. The method of claim 1, wherein modifying the accumulation time based at least in part on the determination whether the derivative of the network traffic rate exceeds a threshold rate includes:

incrementing, by the processing resource, the accumulation time when the derivative of the network traffic rate is greater than the threshold rate; and decrementing, by the processing resource, the accumulation time when the derivative of the network traffic rate is less than the threshold rate.

3. The method of claim 2, wherein incrementing the accumulation time is done by adding a fixed value to a prior instance of the accumulation time; and wherein decrementing the accumulation time is done by subtracting the fixed value from the prior instance of the accumulation time.

4. The method of claim 2, wherein incrementing the accumulation time is done by adding a variable value to a prior instance of the accumulation time; and wherein decrementing the accumulation time is done by subtracting the variable value from the prior instance of the accumulation time.

5. The method of claim 1, wherein the defined time window is user programmable.

6. The method of claim 1, wherein the threshold rate is user programmable.

7. The method of claim 1, wherein the accumulation rate is user programmable.

8. The method of claim 1, wherein the network traffic rate is expressed as a rate selected from a group consisting of: bytes/second, packets/second, and message/second.

9. A system for detecting a denial of service attack, the system comprising:

a processing resource;

a non-transitory computer readable medium coupled to the processing resource and having stored therein instructions that when executed by the processing resource cause the processing resource to:

monitor network traffic;

determine a rate at which the network traffic is occurring to yield a network traffic rate, wherein the network traffic rate is an instant network traffic rate;

determine whether a derivative of the network traffic rate exceeds a threshold rate, wherein the derivative of the network traffic rate is a filtered network traffic rate, wherein determining whether the derivative of the network traffic rate exceeds the threshold rate includes low pass filtering the instant network traffic rate to yield the filtered network traffic rate by averaging the instant network traffic rate with prior instances of network traffic rates occurring in a defined time window to yield the filtered network traffic rate;

modify an accumulation time based at least in part on the determination whether the derivative of the network traffic rate exceeds a threshold rate;

determine whether the accumulation time exceeds an accumulation threshold; and declare a denial of service attack when the accumulation time exceeds the accumulation threshold.

10. The system of claim 9, wherein modifying the accumulation time based at least in part on the determination whether the derivative of the network traffic rate exceeds a threshold rate includes:

incrementing the accumulation time when the derivative of the network traffic rate is greater than the threshold rate; and decrementing the accumulation time when the derivative of the network traffic rate is less than the threshold rate.

11. The system of claim 10, wherein incrementing the accumulation time is done by adding a fixed value to a prior instance of the accumulation time; and wherein decrementing the accumulation time is done by subtracting the fixed value from the prior instance of the accumulation time.

12. The system of claim 10, wherein incrementing the accumulation time is done by adding a variable value to a prior instance of the accumulation time; and wherein decrementing the accumulation time is done by subtracting the variable value from the prior instance of the accumulation time.

13. The system of claim 9, wherein the defined time window is user programmable.

14. The system of claim 9, wherein the threshold rate is user programmable.

15. The system of claim 9, wherein the accumulation rate is user programmable.

16. A non-transitory computer readable medium having stored therein instructions that when executed by a processing resource cause the processing resource to:

monitor network traffic;

determine a rate at which the network traffic is occurring to yield an instant network traffic rate;

low pass filter the instant network traffic rate to yield a filtered network traffic rate by averaging the instant network traffic rate with prior instances of network traffic rates occurring in a defined time window to yield the filtered network traffic rate;

determine whether the filtered network traffic rate exceeds a threshold rate;

modify an accumulation time based at least in part on the determination whether the filtered network traffic rate exceeds a threshold rate;

determine whether the accumulation time exceeds an accumulation threshold; and declare a denial of service attack when the accumulation time exceeds the accumulation threshold.

17. The non-transitory computer readable medium of claim 16, wherein modifying the accumulation time based at least in part on the determination whether the filtered network traffic rate exceeds a threshold rate includes:

incrementing the accumulation time when the filtered network traffic rate is greater than the threshold rate; and decrementing the accumulation time when the filtered network traffic rate is less than the threshold rate.

18. The non-transitory computer readable medium of claim 16, wherein incrementing the accumulation time is done by adding a fixed value to a prior instance of the accumulation time; and wherein decrementing the accumulation time is done by subtracting the fixed value from the prior instance of the accumulation time.

19. The non-transitory computer readable medium of claim 16, wherein incrementing the accumulation time is done by adding a variable value to a prior instance of the accumulation time; and wherein decrementing the accumulation time is done by subtracting the variable value from the prior instance of the accumulation time.

* * * * *